US011599903B2

(12) United States Patent
Brooks et al.

(10) Patent No.: US 11,599,903 B2
(45) Date of Patent: Mar. 7, 2023

(54) ADVERTISEMENT TRACKING INTEGRATION SYSTEM

(71) Applicant: Snap Inc., Santa Monica, CA (US)

(72) Inventors: Kyle Thomas Brooks, Seattle, WA (US); Ashish Wahi, Seattle, WA (US)

(73) Assignee: SNAP INC., Santa Monica, CA (US)

( * ) Notice: Subject to any disclaimer, the term of this patent is extended or adjusted under 35 U.S.C. 154(b) by 84 days.

(21) Appl. No.: 17/301,640

(22) Filed: Apr. 9, 2021

(65) Prior Publication Data

US 2022/0101374 A1 Mar. 31, 2022

Related U.S. Application Data

(60) Provisional application No. 63/085,696, filed on Sep. 30, 2020.

(51) Int. Cl.

| G06Q 30/02 | (2012.01) |
|---|---|
| G06Q 30/0251 | (2023.01) |
| G06Q 50/00 | (2012.01) |
| G06T 11/20 | (2006.01) |
| G06Q 30/0242 | (2023.01) |
| H04L 67/50 | (2022.01) |
| H04L 67/306 | (2022.01) |

(52) U.S. Cl.
CPC ..... *G06Q 30/0255* (2013.01); *G06Q 30/0242* (2013.01); *G06Q 30/0246* (2013.01); *G06Q 50/01* (2013.01); *G06T 11/206* (2013.01); *H04L 67/306* (2013.01); *H04L 67/535* (2022.05); *G06T 2200/24* (2013.01)

(58) Field of Classification Search
CPC .......... G06Q 30/0255; G06Q 30/0242; G06Q 30/0246; G06Q 50/01; H04L 67/535; H04L 67/306; G06T 11/206; G06T 2200/24
See application file for complete search history.

(56) References Cited

U.S. PATENT DOCUMENTS

| 2010/0211457 | A1* | 8/2010 | Martin-Cocher | ..... H04L 51/234 715/764 |
|---|---|---|---|---|
| 2014/0278941 | A1* | 9/2014 | Livingston | ......... G06Q 30/0245 705/14.45 |
| 2015/0134433 | A1* | 5/2015 | Muller | ............... G06Q 30/0251 705/14.16 |

OTHER PUBLICATIONS

Yuchen Zhou et al., Understanding and Monitoring Embedded Web Scripts, May 1, 2015, IEEE Computer Society, pp. 850-865 (Year: 2015).*

(Continued)

*Primary Examiner* — Tam T Tran
(74) *Attorney, Agent, or Firm* — Schwegman Lundberg & Woessner, P.A.

(57) ABSTRACT

Systems and methods for retrieving, in a first application using one or more processors, a user profile in which the user profile includes a user ID, and the first application includes a first application interface. The systems and methods further include detecting user selection, in the first application interface, of a sync command to a second application, in which the second application includes an executable script associated with the user ID, retrieving the executable script in response to the detecting the user selection of the sync command, integrating the executable script into an HTML interface associated with the user profile, and generating a two-dimensional graphical component in response to the integration of the executable script.

20 Claims, 14 Drawing Sheets

(56) References Cited

OTHER PUBLICATIONS

Jonathan R. Mayer et al., Third-Party Web Tracking: Policy and Technology, May 1, 2012, IEEE Computer Society, pp. 413-427 (Year: 2012).*

* cited by examiner

ABSTRACT TRACKING
INTEGRATION SYSTEM

CLAIM OF PRIORITY

This application claims the benefit of priority to U.S. Provisional Application Ser. No. 63/085,696, filed on Sep. 30, 2020, which is incorporated herein by reference in its entirety.

BACKGROUND

Companies who deal in goods and services seek to continue to gain a competitive edge over other competitors in the same industry. The need to attract new customers has never been more important in light of the influx of options consumers have in purchasing goods and services. In order to do so, companies turn to advertising of their goods and services on various outlets, such as through television and radio.

However, a new trend in online advertising has recently become very popular—online social media networking marking and advertising. Some of the benefits to social media marketing include immediate activity on the company's website after a user has viewed the online advertisement broadcasted from the social media network application.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
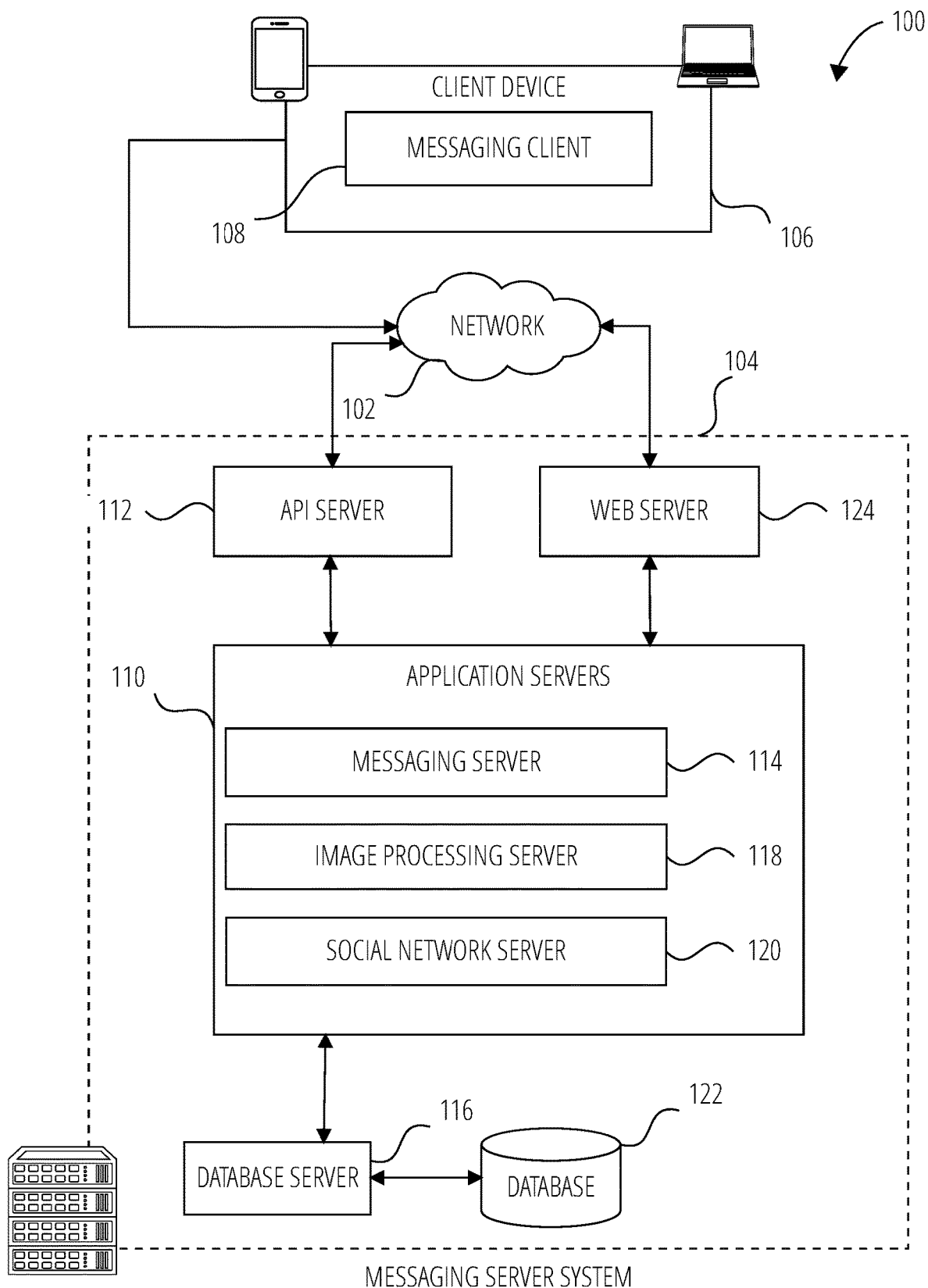
FIG. 1 is a diagrammatic representation of a networked environment in which the present disclosure may be deployed, in accordance with some examples.

While there are many benefits to advertising products to social media network users in social media applications, it is difficult to functionality track, measure and determine network activity on webpages and social media outlets using one centralized eCommerce application that can be hosted by companies who advertise using social media after users have viewed the online advertisements. Through social networking marketing and advertising, companies generate social media posts and broadcast them to users within a social networking application in order to advertise the company's products and services. Some companies utilize third-party eCommerce software applications, e.g. SaaS (Software as a Service) to start, grow, and manage their business. These third party eCommerce software applications also incorporate online marketing tools and campaigns on social media applications for the companies who use their services.

However, it is increasingly difficult for third-party eCommerce software applications to fully integrate the executable code needed to fully and efficiently produce robust graphical representations depicting the network activity on the company's website after online advertisement broadcasting and viewing without having to separately access other software applications that perform the tracking functions. There is an increasingly need of utilizing third-party eCommerce applications as a way to establish and manage eCommerce business by companies, as well as, effectively track and measure users who access their websites utilizing one software application.

In order to improve the infrastructure of social media online targeted advertising tracking using third-party eCommerce applications, in at least one example, the present system is provided that allows synchronizes and integrates an executable script that actively tracks, determines, and measures the cross mobile device impact and activity of online advertisement content collections that are viewed by social media users on the social networking application from one centralized third-party eCommerce application.

When the user the third-party eCommerce application needs to track the website activity of users who have viewed or accessed the targeted social media advertisement broadcast and generated from the social media application, the system actively links and synchronizes the social media applications with the third-party eCommerce application in order streamline the configuration process on one application (e.g., third-party eCommerce application). The third-party eCommerce application interface includes a sync command indicia that is generated so the user can initiate the synchronization feature directly from its own interface.

Once the present social media application and the third-party eCommerce application are synchronized, the executable script is integrated into a back-end HTML web browser hosted by a company that is selected in the third-party eCommerce application's interface, resulting in tracking of user device website activity and the generation of two-dimensional (2D) or three-dimensional (3D) graphical components that are based on the tracked website activity after the client device accessed the advertisement displayed on the social media application.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the Internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

Figure 3:
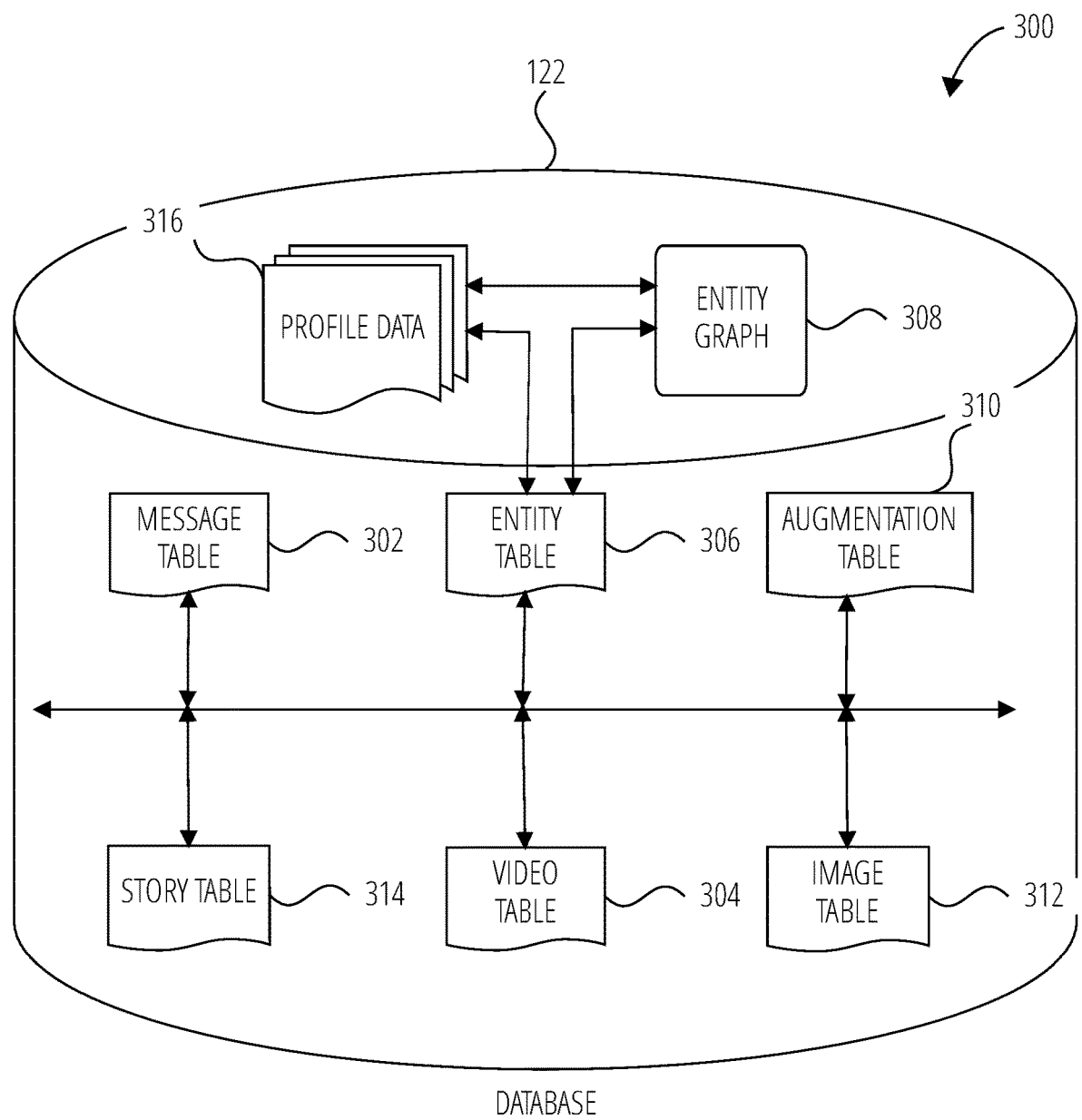
FIG. 3 is a diagrammatic representation of a data structure as maintained in a database, in accordance with some examples.

The social network server 120 supports various social networking functions and services and makes these functions and services available to the messaging server 114. To this end, the social network server 120 maintains and accesses an entity graph 308 (as shown in FIG. 3) within the database 122. Examples of functions and services supported by the social network server 120 include the identification of other users of the messaging system 100 with which a particular user has relationships or is "following," and also the identification of other entities and interests of a particular user.

System Architecture

Figure 2:
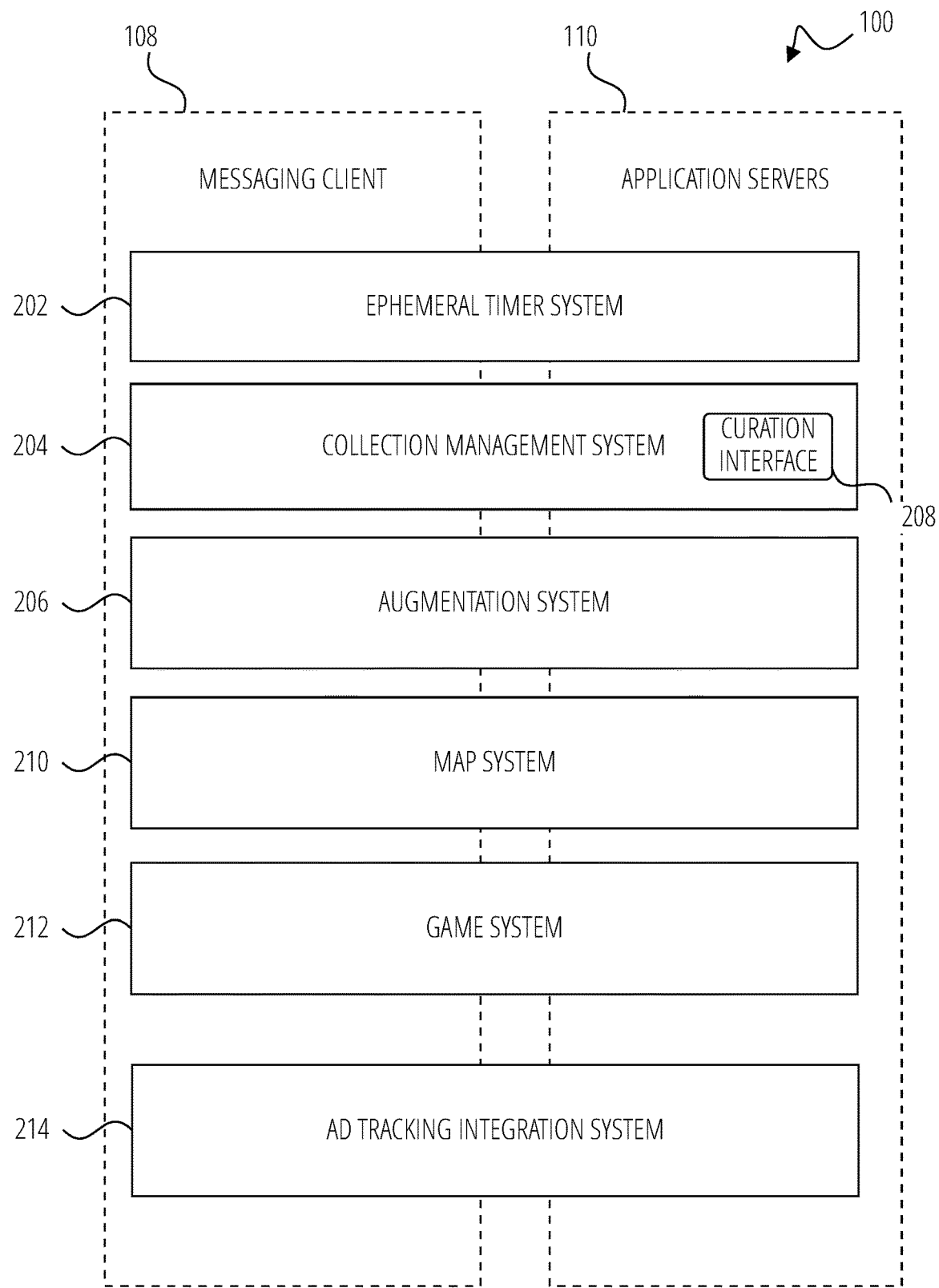
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, game system 212, and an ad tracking integration system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The ad tracking integration system 214 provides various operations, routines, and functions within the context of the messaging server system 104, messaging client 108, and the application servers 110. The operations of the ad tracking integration system 214 are executed at the messaging server system 104, messaging client 108, the client device 106, the application servers 110, or a third-party server and include retrieving a user profile, which includes a user ID, detecting a user selection of a sync command, and retrieving an executable script in response to detecting the user selection of the sync command.

In some examples, the ad tracking integration system 214 can be in communication with the profile data 316 in order to retrieve the executable script (explained below). The operations of the ad tracking integration system 214 also include integrating the executable script into an HTML interface and generating a two-dimensional or three-dimensional graphical component in response to the executable script integration. In other examples, the graphical component is a 2D/3D animation, 2D/3D deformation, or 2D/3D character. In another example, the ad tracking integration system 214 generates, by the one or more processors, a sync command interface the includes a sync command indicia to initiate synchronization of at least one other eCommerce application.

Data Architecture

FIG. 3 is a schematic diagram illustrating data structures 300, which may be stored in the database 122 of the messaging server system 104, according to certain examples. While the content of the database 122 is shown to comprise a number of tables, it will be appreciated that the data could be stored in other types of data structures (e.g., as an object-oriented database).

The database 122 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 104 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 108 to other users. The collection of avatar representations may include "status avatars," which present a graphical representation of a status or activity that the user may select to communicate at a particular time.

The profile data 316 may also store multiple executable scripts associated with the particular entities stored in the profile data 316. In one example the executable scripts can be a segment of JavaScript code that tracks, generates, and measures cross-device network activity in network 102, network 1222, websites after a content collection has been viewed or accessed. The executable script may include configurable event types. The configurable event types correspond to networked activity on a website that is scaled or tracked. The event type may be taken by a client device, such as client device 106. In one example, the event types include purchasing, saving, checking out, content viewing, sign up, subscribing, tutorial completions, payment, sharing, login, ad clicking, rate comparisons, trial acceptance, searching, or adding content to a shopping cart.

In another example, the executable script includes configurable user parameters that are used to identify the user being tracked. For instance, the user parameter can include email or phone number. As mentioned previously, the executable script is generated containing variables, parameters, and event types that are used to track and generate the graphical elements based on the website activity. These variables, parameters, and event types include device purchase activity, page viewing activity, add cart activity, and user sign up activity.

Where the entity is a group, the profile data 316 for the group may similarly include one or more avatar representations associated with the group, in addition to the group name, members, and various settings (e.g., notifications) for the relevant group.

The database 122 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 108 when the sending user is composing a message. Other types of filters include geolocation filters (also known as geo-filters), which may be presented to a sending user based on geographic location. For example, geolocation filters specific to a neighborhood or special location may be presented within a user interface by the messaging client 108, based on geolocation information determined by a Global Positioning System (GPS) unit of the client device 106.

Another type of filter is a data filter, which may be selectively presented to a sending user by the messaging client 108, based on other inputs or information gathered by the client device 106 during the message creation process. Examples of data filters include current temperature at a specific location, a current speed at which a sending user is traveling, battery life for a client device 106, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 106 and then displayed on a screen of the client device 106 with the modifications. This also includes modifications to stored content, such as video clips in a gallery that may be modified. For example, in a client device 106 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 106 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 106) and perform complex image manipulations locally on the client device 106 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 106.

In some examples, a computer animation model to transform image data can be used by a system where a user may capture an image or video stream of the user (e.g., a selfie) using a client device 106 having a neural network operating as part of a messaging client application 104 operating on the client device 106. The transformation system operating within the messaging client 108 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 106 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 108 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 108, to contribute content to a particular live story. The live story may be identified to the user by the messaging client 108, based on his or her location. The end result is a "live story" told from a community perspective.

A further type of content collection is known as a "location story," which enables a user whose client device 106 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

A content collection may also be known as an "ad content collection," "ad story," or "advertisement story," which is a collection of messages, images, GIFs, cinemagraphs, video, or audio data, which is compiled into a collection (e.g., story or gallery) based on a single image or video product or service advertisement. The ad content collection or ad story may also be a single image or video image rendered as a full screen mobile advertisement that can be used and broadcast for business objectives and business marketing from awareness to purchase. In one example, the ad content collection may be displayed in between, after, or during other content collections. An attachment can be added to the ad content collection, such as an active URL to a website or to a installation tool for downloading and installing a mobile application "app. The ad content collection may also rendered in a shoppable ad format that showcases products, services, or experiences sold and marketed online using the messaging server system 104. The ad content collection, when rendered, may be skippable or non-skippable.

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
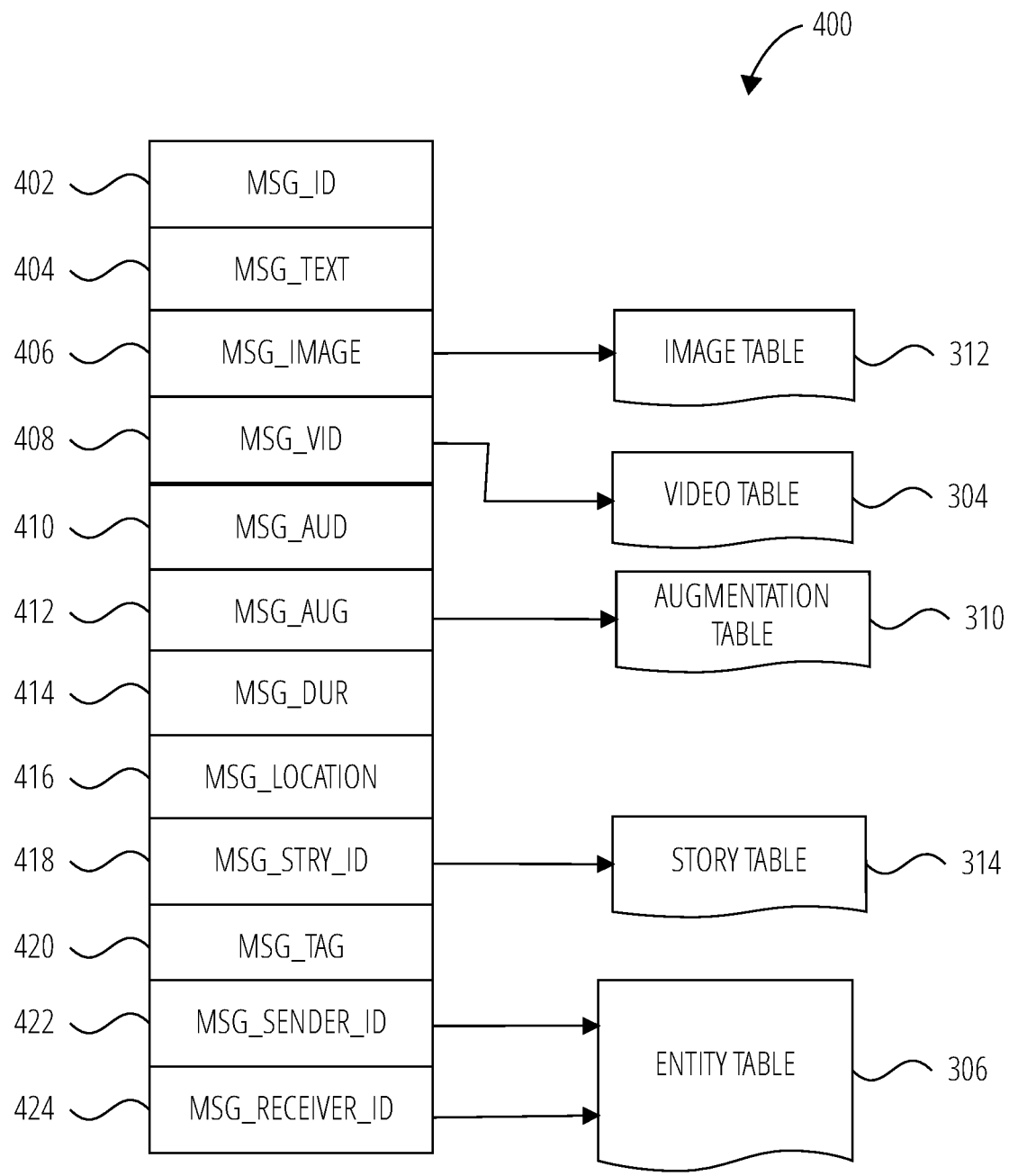
FIG. 4 is a diagrammatic representation of a message, in accordance with some examples.

FIG. 4 is a schematic diagram illustrating a structure of a message 400, according to some examples, generated by a messaging client 108 for communication to a further messaging client 108 or the messaging server 114. The content of a particular message 400 is used to populate the message table 302 stored within the database 122, accessible by the messaging server 114. Similarly, the content of a message 400 is stored in memory as "in-transit" or "in-flight" data of the client device 106 or the application servers 110. A message 400 is shown to include the following example components:

message identifier 402: a unique identifier that identifies the message 400.

message text payload 404: text, to be generated by a user via a user interface of the client device 106, and that is included in the message 400.

message image payload 406: image data, captured by a camera component of a client device 106 or retrieved from a memory component of a client device 106, and that is included in the message 400. Image data for a sent or received message 400 may be stored in the image table 312.

message video payload 408: video data, captured by a camera component or retrieved from a memory component of the client device 106, and that is included in the message 400. Video data for a sent or received message 400 may be stored in the video table 304.

message audio payload 410: audio data, captured by a microphone or retrieved from a memory component of the client device 106, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 108.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 106 on which the message 400 was generated and from which the message 400 was sent.

message receiver identifier 424: an identifier (e.g., a messaging system identifier, email address, or device identifier) indicative of a user of the client device 106 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
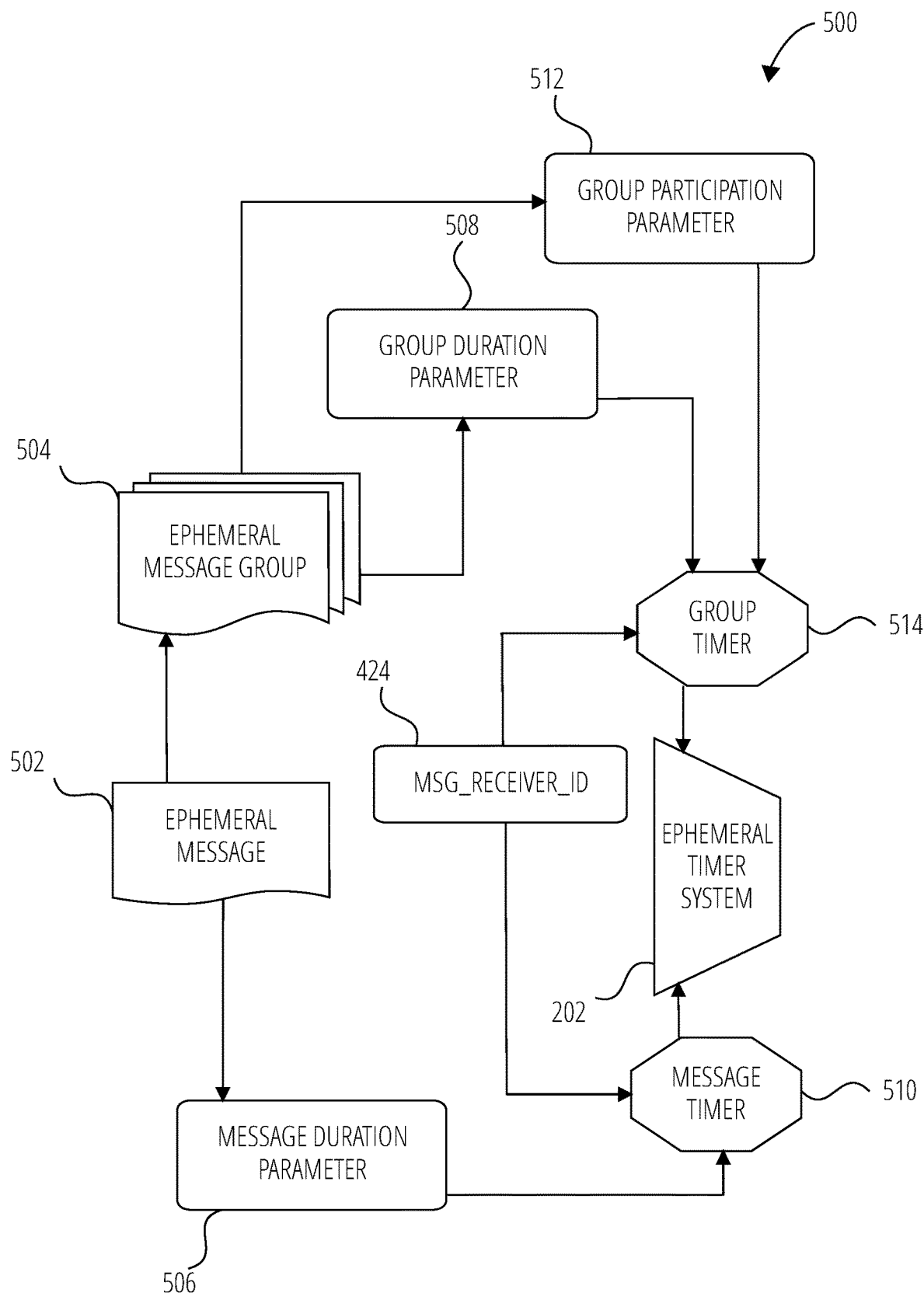
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 108. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 108) to cause an indicium (e.g., an icon) associated with the relevant ephemeral message group 504 to no longer be displayed within a user interface of the messaging client 108. Similarly, when the ephemeral timer system 202 determines that the message duration parameter 506 for a particular ephemeral message 502 has expired, the ephemeral timer system 202 causes the messaging client 108 to no longer display an indicium (e.g., an icon or textual identification) associated with the ephemeral message 502.

Figure 6:
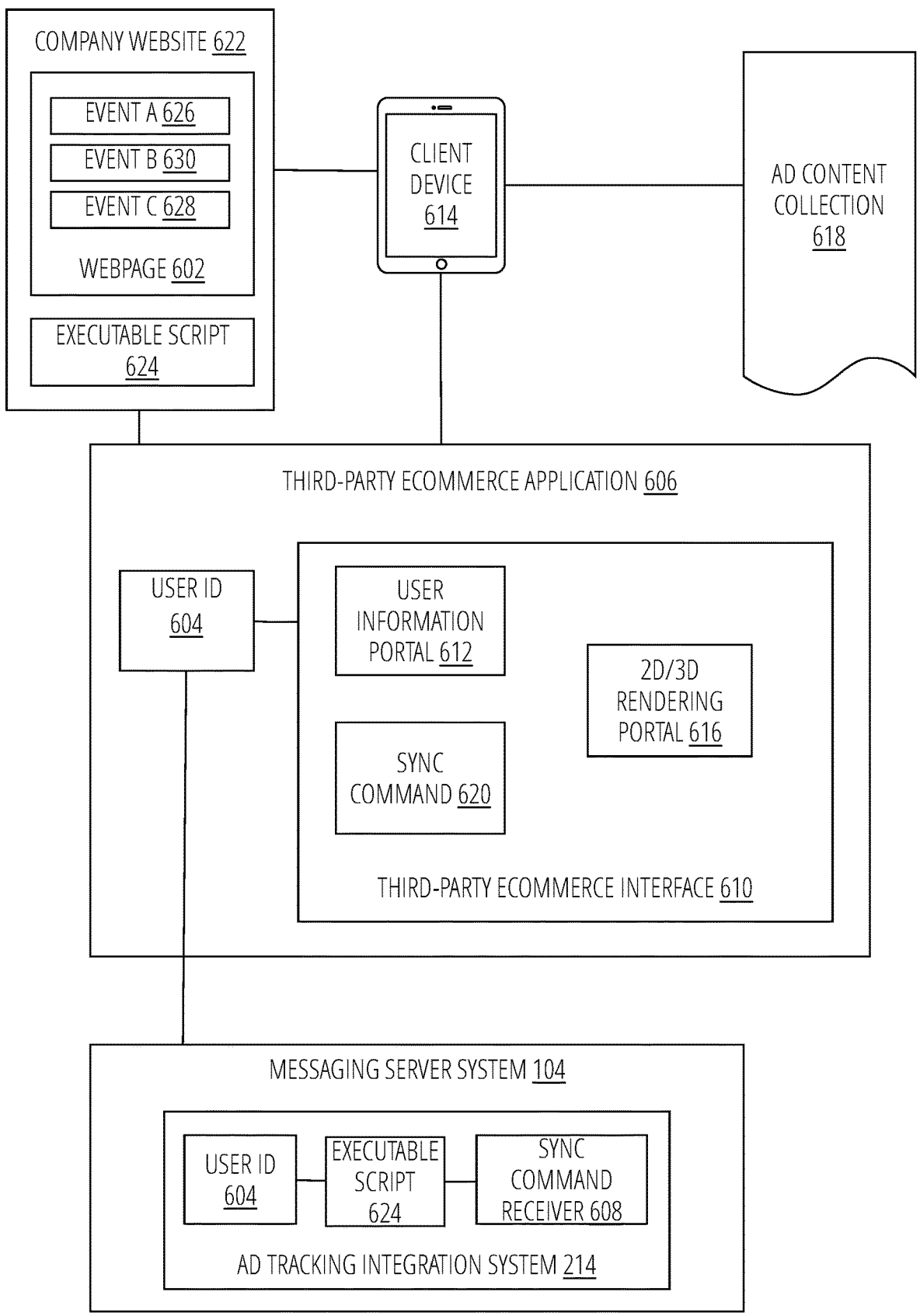
FIG. 6 is a diagrammatic representation of the synchronization and integration tracking system, in accordance with some examples.

FIG. 6 is a diagrammatic representation of the synchronization and integration tracking system, in accordance with some examples. A client device 614 is shown to be associated with viewing an ad content collection 618. The client device 614 can be a mobile device, smartphone, tablet, or wearable device. In some examples, the ad content collection 618 is an "ad story" or "advertisement story," which is a collection of messages, images, GIFs, cinemagraphs, video, or audio data, which is compiled into a collection (e.g., story or gallery) based on a single image or video product or service advertisement broadcast or rendered as a full screen mobile device product or service advertisement. In one example, the ad content collection 618 is generated by the messaging server system 104 and stored in database 122 of the messaging server system 104.

The ad content collection 618 may be displayed in between, after, or during other content collections and that showcases products, services, or experiences sold and marketed online include an attachment such as an active URL to a website or to a installation tool for downloading and installing a mobile application "app. The ad story may also rendered in a shoppable ad format.

After the client device 614 views the ad content collection 618, the client device 614 accesses a company website 622 associated with the ad content collection 618. The client device 614 performs activities and events on the company website 622 webpage 602 which include at least event A 626, event B 630, and event C 628 after the client device 614 has viewed or the ad content collection 618. Although events A, B, and C are listed for illustration purposes, any number of events can be performed at the company web site 622.

In some examples, the event A 626, event B 630, and event C 628 can include, but are not limited to executing purchases, adding products to a wish list, checking out, adding products to an electronic shopping cart, viewing content, conducting payment transactions, activating subscriptions, performing logins, sharing content, activating rates, product clicks, types of devices that accessed the company web site 622, types of browsers that were used to access the company website 622, and product views.

In some examples, the third-party third-party eCommerce Application 606 is a cloud-based and hosted eCommerce application where users, also known as merchants, create and customize an online store. The users of the third-party eCommerce Application 606 can manage products, manage inventory, and conduct payment transactions. Each user can customize their online store integrated into the third-party eCommerce Application 606 with templates containing images, logos, texts and videos to complete a desired brand look.

The third-party eCommerce Application 606 includes a third-party ecommerce interface 610 in which user interface elements, such as the sync command 620, 2D/3D rendering portal 616, and user information portal 612 are displayed. The user information portal 612 is a graphical element that links and displays user information associated with an account of the user.

The sync command 620 is a graphical element indicia that when activated, initiates the integration and synchronization of the user account associated with the messaging server system 104. In one example, the sync command 620 can be a dialog box that a user can select, a three-dimensional element or animation graphical element. The 2D/3D rendering portal 616 is a volumetric graphical display element that displays a two-dimensional or three-dimensional graphical component that is generated using image processing techniques and 3D rendering protocols from user activity, such as event a 626, event b 630, and event c 628.

The graphical component is a 2D/3D animation, 2D/3D deformation, or 2D/3D character. The user ID 604 is stored in both the third-party eCommerce Application 606 and messaging server system 104 and corresponds to an alpha-numeric string of characters associated with user in the third-party eCommerce Application 606 and messaging server system 104.

Still referring to FIG. 6, the messaging server system 104 includes the ad tracking integration system 214 which integrates the executable script 624 into the back-end HTML interface of the company website 622 upon activating the sync command 620 at the third-party eCommerce Application 606. The sync command receiver 608 compiled into the ad tracking integration system 214 is configured to receive the sync command 620 and integrate the executable script 624 associated with the user ID 604 stored at the profile data 316 of the messaging server system 104 into the back-end HTML browser of the company website 622. By integrating the executable script 624, the ad tracking integration system 214 tracks the event activities on the company website 622.

In some examples, tracking the event activities on the company website 622 includes matching user parameters, such as a client device user's email or phone number, back to the client device user's email or phone number stored in the messaging server system 104. Additional user parameters can also be matched which include, transaction IDs, price IDS, and number of items. Customize user parameters can also be configured in the ad tracking integration system 214.

In some examples, the executable script 624 is a partial or full segment of specialized configurable JavaScript code that instructions the system to track, generate, and measure cross mobile device network activity and events after the mobile device has viewed, accessed, or streamed an ad content collection 618 or content collection. In some embodiments, the executable script 624 generates the 2D/3D graphical components, animations, deformations, or characters displayed in the 2D/3D rendering portal 616.

Figure 7:
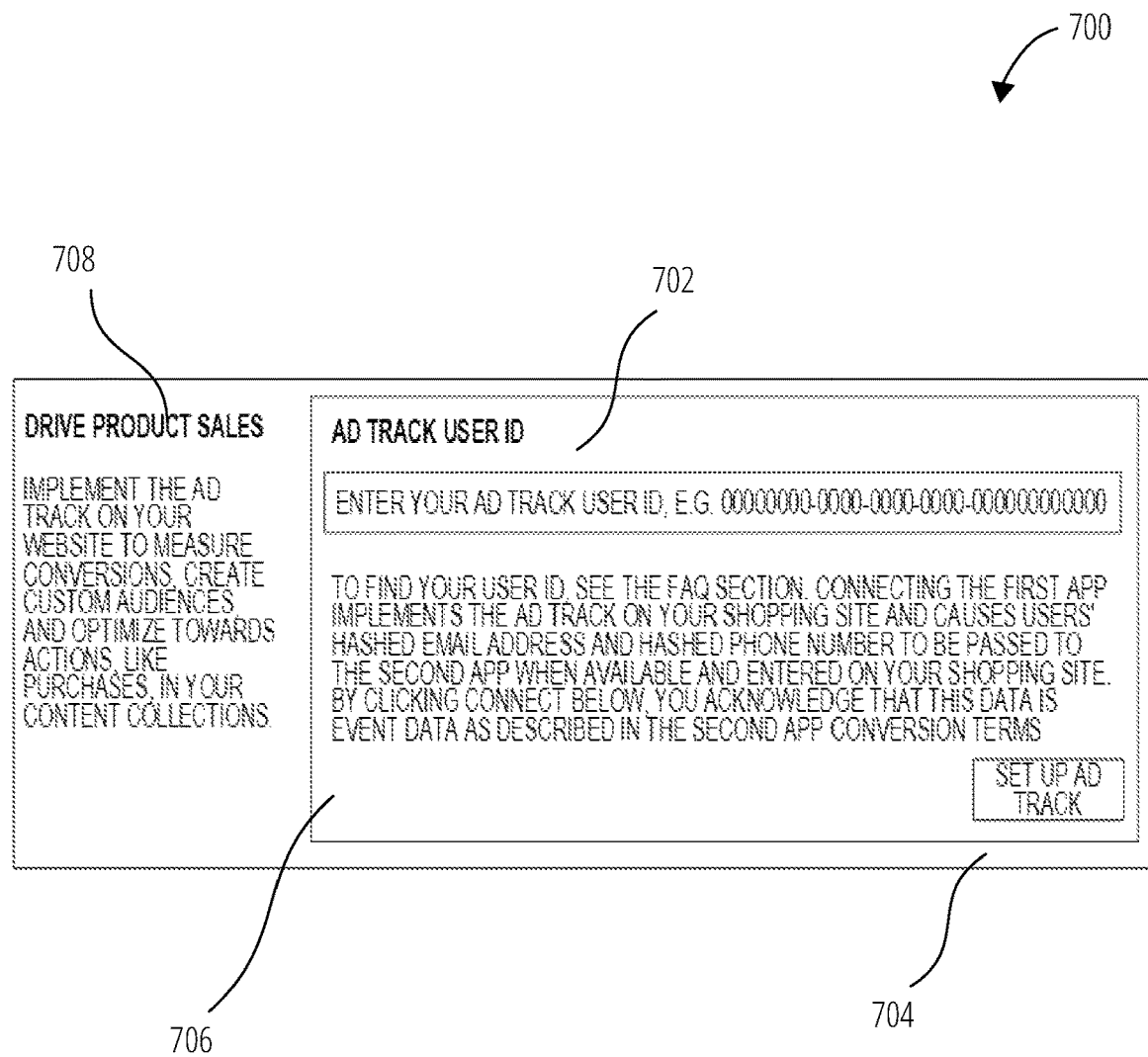
FIG. 7 is a user interface diagram illustrating an example user interface of a user ID depicted in a first eCommerce application, in accordance with one embodiment.

FIG. 7 is a user interface diagram 700 illustrating an example user interface of a user ID depicted in a first eCommerce application, in accordance with one embodiment. The first eCommerce application corresponds to the third-party third-party eCommerce Application 606, which is a cloud-based and hosted eCommerce application where users, also known as merchants, create and customize an online store. The users of the third-party eCommerce Application 606 can also manage products, manage inventory, and conduct payment transactions.

In some examples, the depicted user interface of the user ID, which is also referred to as the first application interface 700, includes a user ID field 702, new User ID activation indicia 704, legal disclaimer data field 706, and a product information text 708. The user ID field 702, shown as "AD TRACK USER ID" is a field that receives an alpha-numeric unique identification character string that is associated with a user account stored at a second application, such as the messaging application 1346 of the messaging server system 104.

Should the user of the third-party eCommerce Application 606 not have a user ID 604, the system may generate one or more new user IDs upon pressing the new User ID activation indicia 704 shown in FIG. 7. The legal disclaimer data field 706 displays a legal disclaimer informing the user of various forms of legal liability, while the product information text 708 display information pertaining to the product features associated with the ad ad tracking integration system 214.

Figure 8:
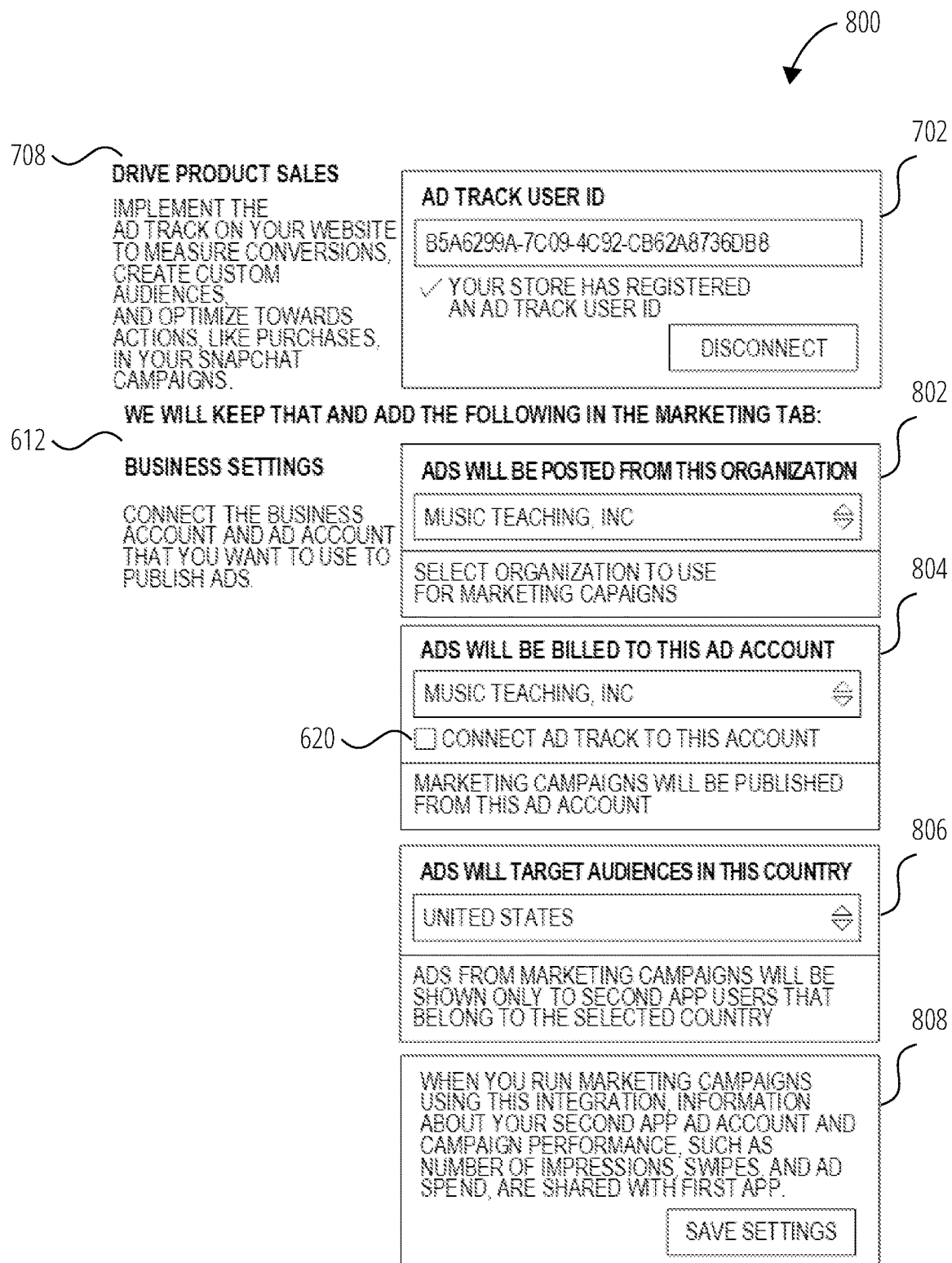
FIG. 8 is a user interface diagram illustrating an example user interface of a non-activated sync command depicted in a second eCommerce application, in accordance with some examples.

FIG. 8 is a user interface diagram 800 illustrating an example user interface of a non-activated sync command depicted in a second eCommerce application, in accordance with some examples. As shown in FIG. 8, the user ID field 702 and product information text 708 are displayed above the user information portal 612. In the user ID field 702, the alpha-numeric user ID 604 associated with the user account information and executable script 624 stored at the messaging server system 104 has been entered by the user. A confirmation message is also displayed below the user ID field 702 informing the user that the associated user account has been found and retrieved at the second application stored at the messaging server system 104 shown in FIG. 6.

The user information portal 612 depicts graphical elements, such as a user organization field 802, a user organization account field 804, a content collection target country field 806, and a legal disclaimer field 808. For illustrative purposes, the user organization field 802 contains the business user account entity "MUSIC TEACHING, INC" which is directly associated with the user ID 604 entered into the user ID field 702. The user organization account field 804 includes the billing account information in which the third-party eCommerce Application 606 will be billed. The ad tracking integration system 214 is activated upon selecting the sync command 620 displayed in the user organization account field 804.

As shown, the sync command 620 is a dialog box in which the user can apply a user gesture, such as clicking the dialog box or pressing the dialog box, in order to activate the sync command 620. As shown in FIG. 8, the sync command 620 does not contain an "X" or other identifying mark displaying that the sync command 620 has been activated.

In some examples, the content collection target country field 806 identifies the country in which the ad content collection 618 should be transmitted and broadcast to user devices, including user ID 604. For illustrative purposes, the "UNITED STATES" is shown. For example, ad content collection 618 will only be shown to users of the messaging client 108 of the messaging server system 104 that are within the network vicinity of the United States. As also shown, legal disclaimer field 808 displays legal information and an option for saving the user settings via a save icon indicia.

Figure 9:
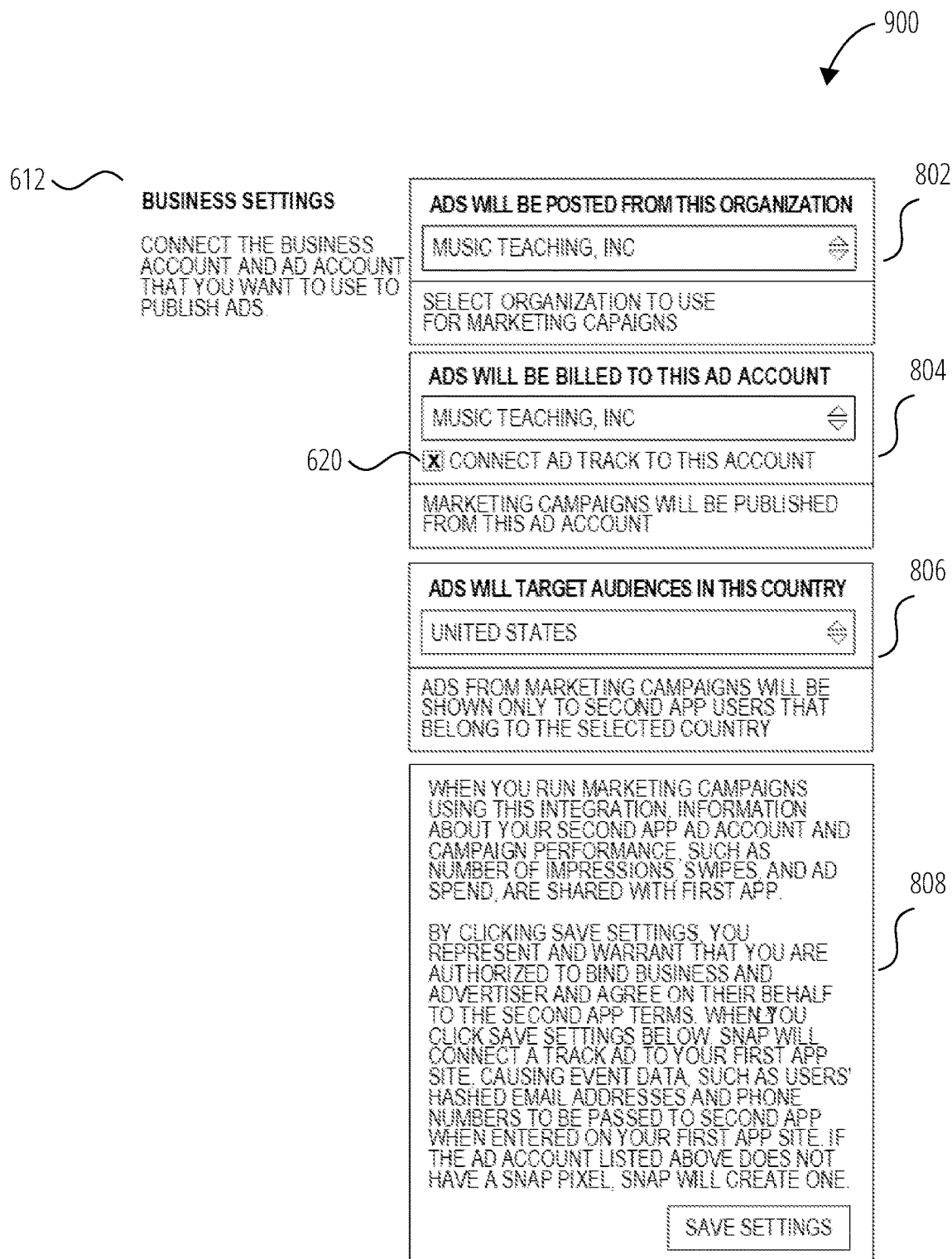
FIG. 9 is a user interface diagram illustrating an example user interface of an activated sync command depicted in a second eCommerce application, in accordance with some examples.

FIG. 9 is a user interface diagram 900 illustrating an example user interface of an activated sync command depicted in a second eCommerce application, in accordance with some examples. The user information portal 612 depicts the user organization field 802, the user organization account field 804, the content collection target country field 806, and the legal disclaimer field 808.

For illustrative purposes, the user organization field 802 contains the business user account entity "MUSIC TEACHING, INC" which is directly associated with the user ID 604 entered into the user ID field 702. The user organization account field 804 includes the billing account information in which the third-party eCommerce Application 606 will be billed. As depicted in FIG. 9, an "X" is shown in the sync command 620 dialog box displayed in the user information portal 612 of the third-party eCommerce Application 606. The "X" confirms that the ad tracking integration system 214 has been activated.

As discussed previously in FIG. 6, now that the sync command 620 has been activated at the the third-party eCommerce Application 606, the ad tracking integration system 214 synchronizes and links the messaging server system 104 with the third-party eCommerce Application 606 by transmitting and integrating the executable script 624 into the back-end HTML browser interface of the company website 622.

In some examples, the sync command 620 is a dialog box in which the user can apply a user gesture, such as clicking the dialog box or pressing the dialog box, in order to activate the sync command 620. While the content collection target country field 806 retains the "UNITED STATES" designation, the legal disclaimer field 808 includes new and different legal disclaimer information informing the user that the third-party eCommerce Application 606 will be tracking activity conducted on the associated webpage using a second application, e.g., messaging application stored at the messaging server system 104.

Figure 10:
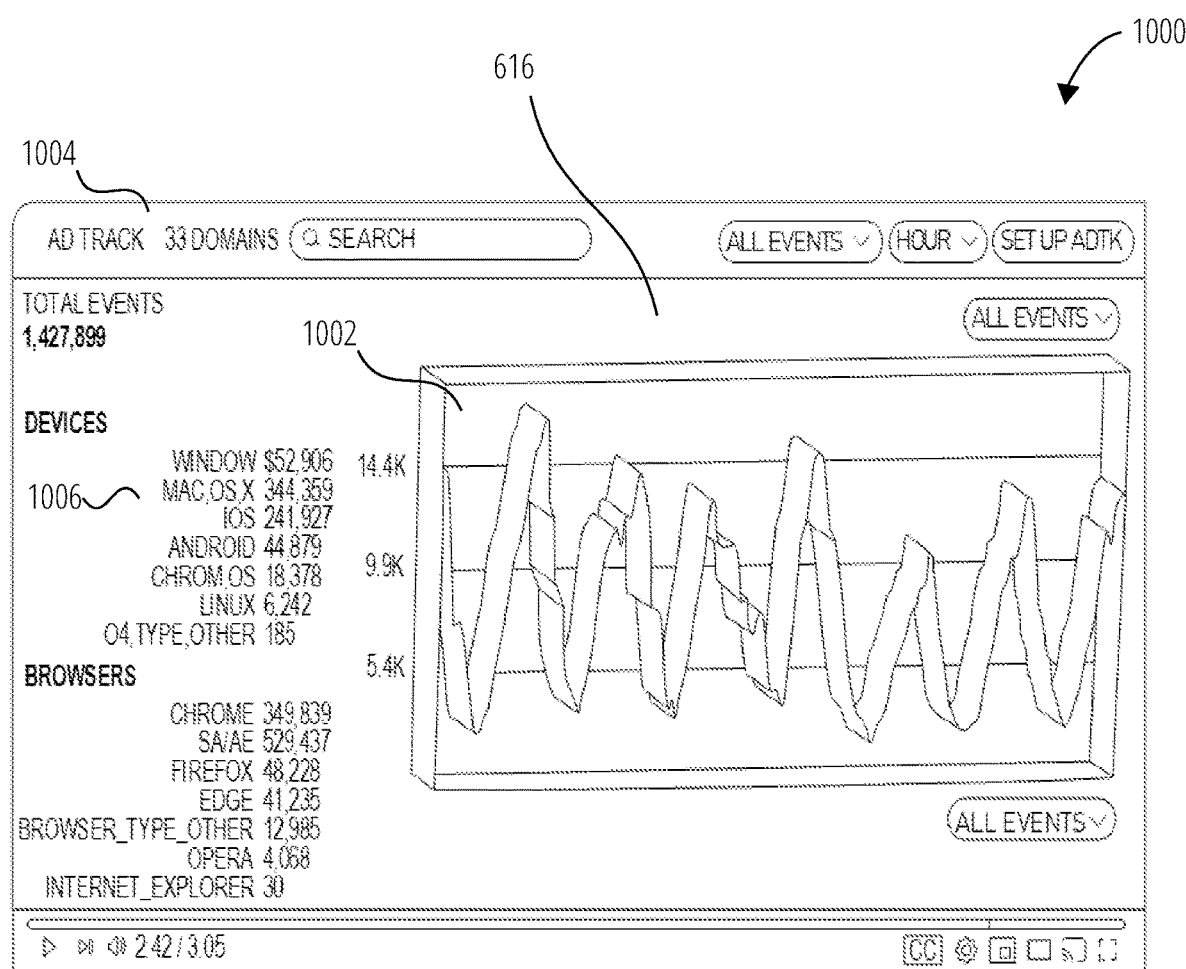
FIG. 10 is a user interface diagram illustrating an example user interface of a three-dimensional rendering portal depicting a three-dimensional graphical component, in accordance with some examples.

FIG. 10 is a user interface diagram 1000 illustrating an example user interface of a three-dimensional rendering portal depicting a three-dimensional graphical component, in accordance with some examples. As shown in FIG. 10, the user interface diagram 1000 includes a 2D/3D rendering portal 616 that displays a 2D/3D graphical component 1002 that is generated and displayed by the ad tracking integration system 214, a 2D/3D rendering portal toolbar 1004, and event activity elements 1006.

In some examples, the 2D/3D rendering portal 616 can be rendered at the third-party ecommerce interface 610 of the third-party eCommerce Application 606, a messaging application interface of the messaging server system 104, or at an interface of the messaging client 108. For illustrative purposes, the 2D/3D graphical component 1002 corresponds to a three-dimensional graph 1002.

The 3D graph 1002 represents surface plots of three dimensional data designated and plotted on an X axis, Y axis, and Z axis of the coordinate plane relative to the 2D/3D rendering portal 616. In some examples, the surface plot 3D data represent the event activity elements 1006 (e.g., event A 626, event B 630, and event C 628 shown in FIG. 6). The event activity elements 1006 represent the types of devices that accessed the company website 622 (e.g., Android and IOS) and the types of internet browsers that were used to access the company website 622 (e.g., CHROME and SAFARI).

Although a 3D graph 1002 is shown as the 2D/3D graphical component 1002, any 2D or 3D graphical component can be generated and displayed in the 2D/3D rendering portal 616. For instance, any 2D/3D character, 2D/3D animation, or 2D/3D object representing the event activity elements 1006 can be rendered in the 2D/3D rendering portal 616. The 2D/3D rendering portal toolbar 1004 provides the user of the 2D/3D rendering portal 616 with additional options to manipulate the 2D/3D graphical component 1002, e.g., 3D graph. These options include a drop-down listing of event types.

Figure 11:
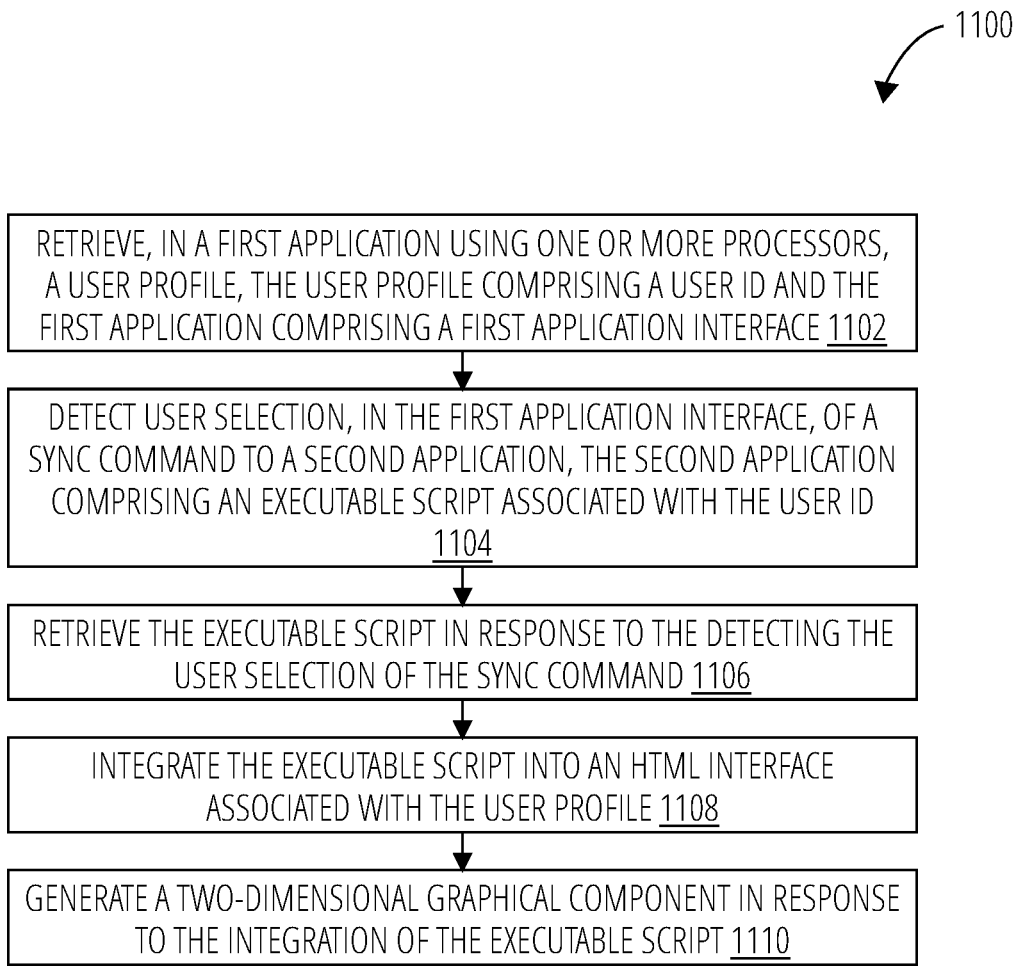
FIG. 11 is a flowchart illustrating a method for integrating the executable script into a first eCommerce application, in accordance with some examples.

FIG. 11 is a flowchart illustrating a method 1100 for integrating the executable script into a first eCommerce application, in accordance with some examples. While certain operations of the method 1100 are described as being performed by certain devices, in different examples different devices or a combination of devices may perform these operations. For example, operations described below as being performed by a computing client device, computing device, the client device 106, a server-side computing device (e.g., the messaging server system 108), or third-party server computing device.

The method commences with operation 1102, during which the client device 106, and more specifically, an application executing on the client device 106 (e.g., messaging application or third-party eCommerce Application 606) retrieves, in a first application using one or more processors, a user profile, the user profile comprising a user ID and the first application comprising a first application interface.

In some examples, the first application is the third-party eCommerce Application 606 that resides on a cloud-based server separate from the messaging server system 104. The third-party eCommerce Application 606 is a eCommerce application that allows users to manage products, manage inventory, and conduct payment transactions while customizing their online store integrated into the third-party eCommerce Application 606 with templates containing images, logos, texts and videos to complete a desired brand look. The user profile contains a database entry of user information corresponding to the user's business or online store, such as business name, business address, business email, business phone number, user ID 604 and the like.

As mentioned previously, the user ID 604 is stored by both the third-party eCommerce Application 606 and messaging server system 104 and corresponds to an alphanumeric string of characters associated with the user account and user designation in the third-party eCommerce Application 606 and messaging server system 104. In some examples, the third-party ecommerce interface 610, shown in FIG. 6, corresponds to the first application interface.

In operation 1104, the computing device detects user selection, in the first application interface, of a sync command to a second application, the second application comprising an executable script associated with the user ID. As mentioned previously, the second application includes the messaging client 108 or social media application stored in the messaging server system 104.

In some examples, the user selection corresponds to a user gesture being applied to the sync command 620 situated in the third-party ecommerce interface 610 as depicted in FIG. 6. The sync command 620 initiates the synchronization of the third-party eCommerce Application 606 with the messaging client 108 executed by the messaging server system 104. The executable script 624 is stored at the messaging server system 104 and corresponds to a full or partial segment of JavaScript coding that monitors and tracks networked client device event activity executed on the company website 622 after the client devices views at least one ad content collection 618 generated and broadcast by the messaging server system 104.

Although JavaScript is used, any object-oriented coding can be used to integrate the executable code. In operation 1106, the computing device retrieves the executable script in response to detecting the user selection of the sync command. In some examples, the retrieval of the executable script is determined based on the user ID stored at the third-party eCommerce Application 606 matching with the user ID stored at the messaging server system 104. The executable script 624 is stored at a memory location of the database 122.

In operation 1108, the computing device integrates the executable script into an HTML interface associated with the user profile. In other examples, the executable script can be embedded on the front end of the first application (e.g., third-party eCommerce Application 606) automatically after the user gesture is applied to the sync command. In operation 1110, the computing device generates a two-dimensional graphical component in response to the integration of the executable script. The two-dimensional graphical component represents the graphical and deformable representation of the network user activity and event event activity elements 1006 executed at the company website 622 associated with the user of the third-party eCommerce Application 606. In other examples, a three-dimensional graphical component can be generated based on the executable script integration and event activity elements 1006. As previously mentioned, the three-dimensional graphical component can be a 3D model, 3D object, 3D animation, 3D character, or 3D diagram.

Machine Architecture

Figure 12:
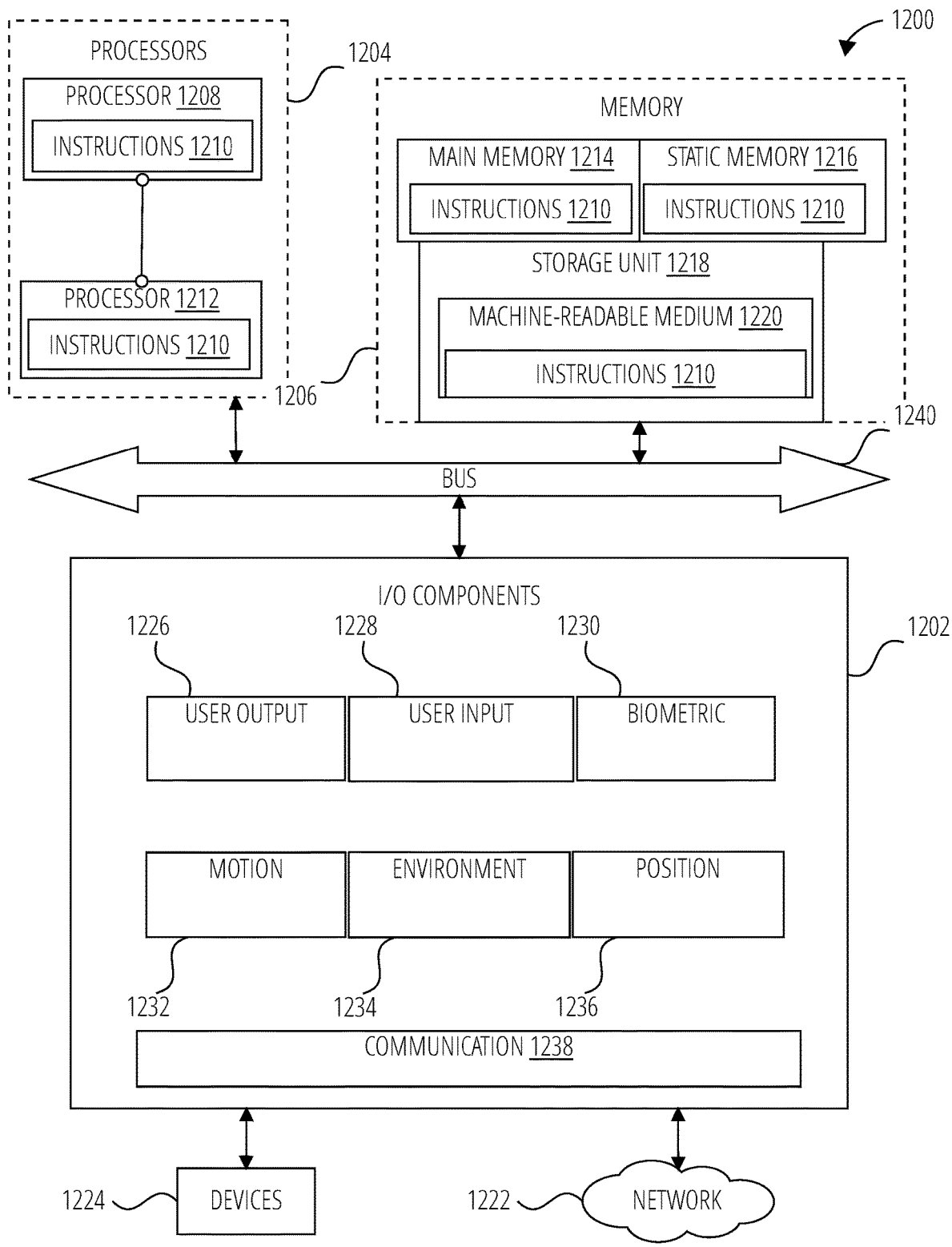
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1210 (e.g., software, a program, an application, an applet, an app, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein. The machine 1200, for example, may comprise the client device 106 or any one of a number of server devices forming part of the messaging server system 104. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 638, which may be configured to communicate with each other via a bus 1240. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that execute the instructions 1210. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1214, a static memory 1216, and a storage unit 1218, both accessible to the processors 1204 via the bus 1240. The main memory 1206, the static memory 1216, and storage unit 1218 store the instructions 1210 embodying any one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the Processor's cache memory), or any suitable combination thereof, during execution thereof by the machine 1200.

The I/O components 1202 may include a wide variety of components to receive input, provide output, produce output, transmit information, exchange information, capture measurements, and so on. The specific I/O components 1202 that are included in a particular machine will depend on the type of machine. For example, portable machines such as mobile phones may include a touch input device or other such input mechanisms, while a headless server machine will likely not include such a touch input device. It will be appreciated that the I/O components 1202 may include many other components that are not shown in FIG. 12. In various examples, the I/O components 1202 may include user output components 1226 and user input components 1228. The user output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope).

The environmental components 1234 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 1236 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface Component or another suitable device to interface with the network 1222. In further examples, the communication components 1238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and memory of the processors 1204) and storage unit 1218 may store one or more sets of instructions and data structures (e.g., software) embodying or used by any one or more of the methodologies or functions described herein. These instructions (e.g., the instructions 1210), when executed by processors 1204, cause various operations to implement the disclosed examples.

The instructions 1210 may be transmitted or received over the network 1222, using a transmission medium, via a network interface device (e.g., a network interface component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Software Architecture

Figure 13:
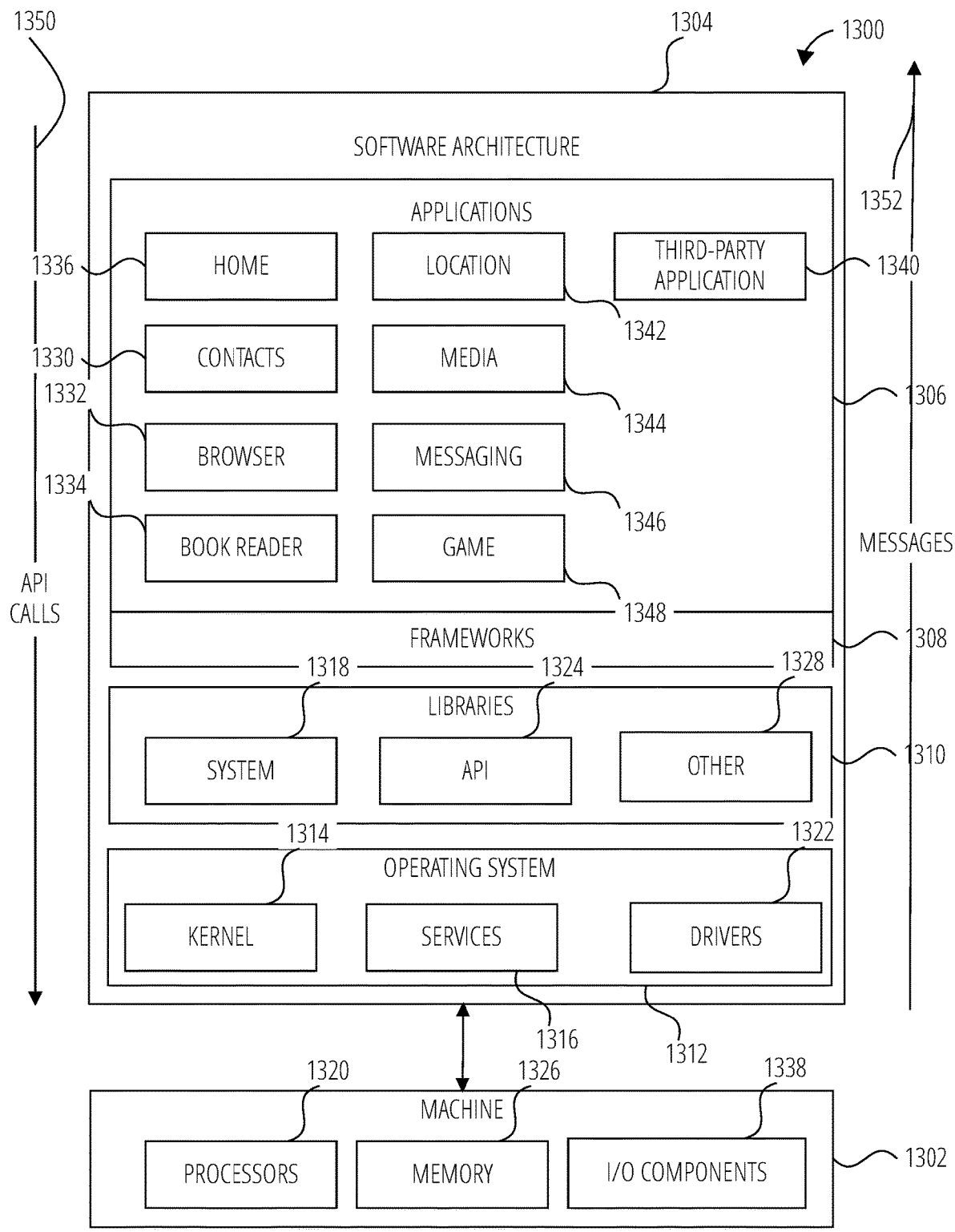
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Processing Components

Figure 14:
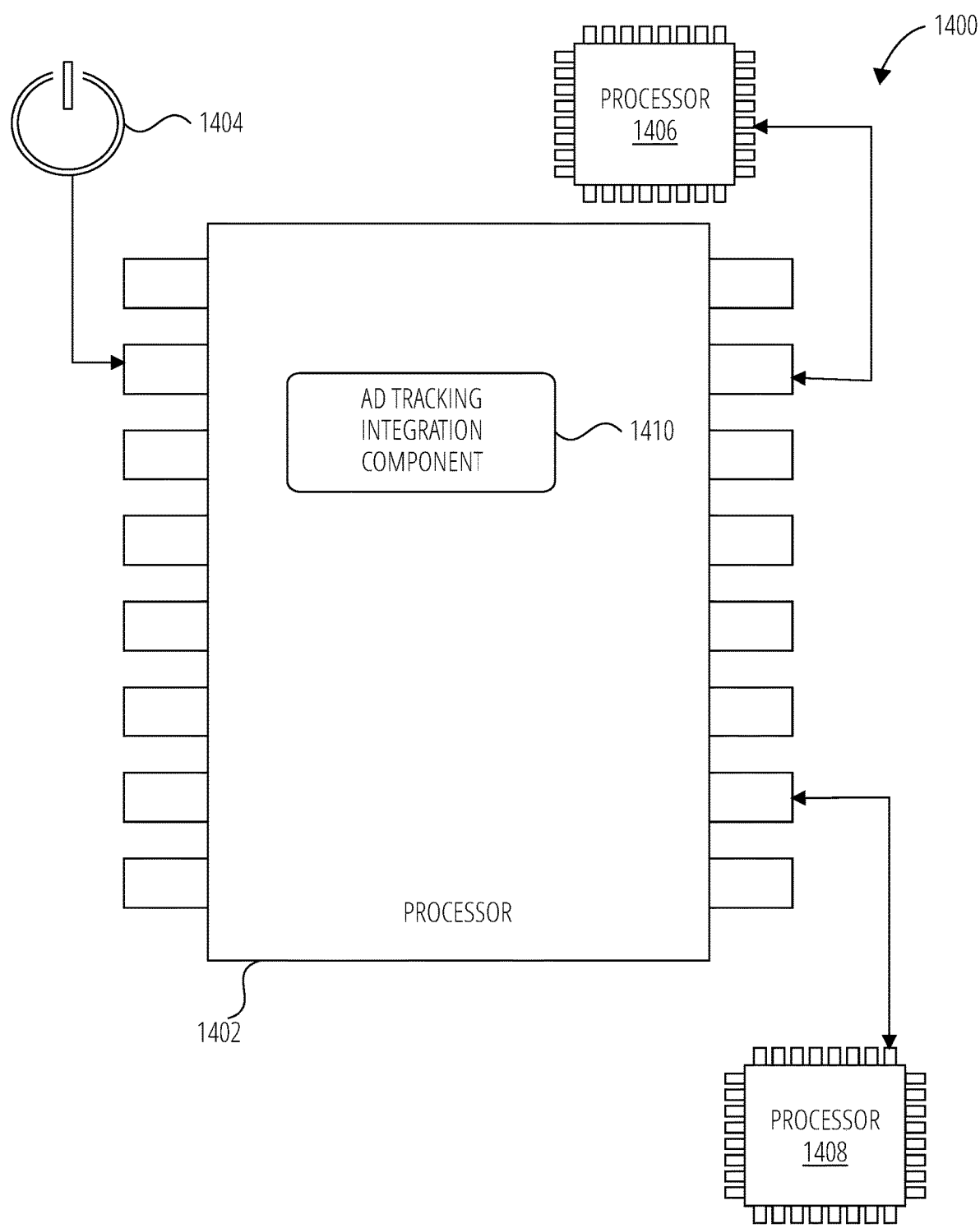
FIG. 14 is a diagrammatic representation of a processing environment, in accordance with some examples.

Turning now to FIG. 14, there is shown a diagrammatic representation of a processing environment 1400, which includes a processor 1402, a processor 1406, and a processor 1408 (e.g., a GPU, CPU or combination thereof).

The processor 1402 is shown to be coupled to a power source 1404, and to include (either permanently configured or temporarily instantiated) modules, namely an Ad tracking integration component 1410. The Ad tracking integration component 1410 operationally retrieves, in a first application, a user profile, the user profile includes a user ID and the first application includes a first application interface, detects user selection, in the first application interface, of a sync command to a second application, the second application including an executable script associated with the user ID, retrieves the executable script in response to the detecting the user selection of the sync command, integrates the executable script into an HTML interface associated with the user profile, generates a two-dimensional graphical component in response to the integration of the executable script. While note shown, the processor 1204 can alternatively include the ad tracking integration component 1410 that performs the operations of the ad tracking integration system 214. As illustrated, the processor 1402 is communicatively coupled to both the processor 1406 and the processor 1408.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
retrieving, in a first application using one or more processors, a user profile, the user profile comprising a user ID and the first application comprising a first application interface;
detecting user selection, in the first application interface, of a sync command to a second application, the second application comprising an executable script associated with the user ID;
retrieving the executable script in response to the detecting the user selection of the sync command;
integrating the executable script into an HTML interface associated with the user profile; and
generating a two-dimensional graphical component in response to the integration of the executable script.

2. The method of claim 1, wherein the executable script comprising at least one field use parameter and at least one event type parameter.

3. The method of claim 2, wherein the generating of the two-dimensional graphical component is based on executing the at least one field use parameter and the at least one event type parameter as a variable of the executable script.

4. The method of claim 3, wherein the at least one field use parameter comprises at least one email address and the at least one event type parameter comprises a page view action at a webpage associated with the user profile.

5. The method of claim 1, further comprising:
generating a three-dimensional graphical component in response to the integration of the executable script.

6. The method of claim 5, further comprising:
generating a second user ID in response to receiving a second user selection of a new user ID generation command in the first application interface.

7. The method of claim 1, wherein the first application comprises an eCommerce application.

8. The method of claim 1, wherein the second application comprises a social networking application.

9. The method of claim 1, wherein the user profile comprises a company name, a company address, a company phone number, and a company email address.

10. The method of claim 1, wherein the user ID comprises an alpha-numeric unique identifier linked to the user profile.

11. A system comprising:
a processor; and
a memory storing instructions that, when executed by the processor, configure the system to performing operations comprising:
retrieving, in a first application using one or more processors, a user profile, the user profile comprising a user ID and the first application comprising a first application interface;
detecting user selection, in the first application interface, of a sync command to a second application, the second application comprising an executable script associated with the user ID;
retrieving the executable script in response to the detecting the user selection of the sync command;
integrating the executable script into an HTML interface associated with the user profile; and
generating a two-dimensional graphical component in response to the integration of the executable script.

12. The system of claim 11, wherein the executable script comprising at least one field use parameter and at least one event type parameter.

13. The system of claim 12, wherein the generating of the two-dimensional graphical component is based on executing the at least one field use parameter and the at least one event type parameter as a variable of the executable script.

14. The system of claim 13, wherein the at least one field use parameter comprises at least one email address and the at least one event type parameter comprises a page view action at a webpage associated with the user profile and wherein the user ID comprises an alpha-numeric unique identifier linked to the user profile.

15. The system of claim 11, wherein the instructions further configure the system to perform operations comprising:
generating a three-dimensional graphical component in response to the integration of the executable script.

16. The system of claim 15, wherein the instructions further configure the system to perform operations comprising:
generating a second user ID in response to receiving a second user selection of a new user ID generation command in the first application interface.

17. The system of claim 11, wherein the first application comprises an eCommerce application and the second application comprises a social networking application.

18. The system of claim 11, wherein the user profile comprises a company name, a company address, a company phone number, and a company email address.

19. A non-transitory computer-readable storage medium, the computer-readable storage medium including instructions that when executed by a computer, cause the computer to perform operations comprising:
retrieving, in a first application using one or more processors, a user profile, the user profile comprising a user ID and the first application comprising a first application interface;
detecting user selection, in the first application interface, of a sync command to a second application, the second application comprising an executable script associated with the user ID;
retrieving the executable script in response to the detecting the user selection of the sync command;
integrating the executable script into an HTML interface associated with the user profile; and
generating a two-dimensional graphical component in response to the integration of the executable script.

20. The non-transitory computer-readable storage medium of claim 19, wherein the executable script comprises at least one field use parameter and at least one event type parameter and the generating of the two-dimensional graphical component is based on executing the at least one field use parameter and the at least one event type parameter as a variable of the executable script.

* * * * *